United States Patent
Prociw et al.

(10) Patent No.: US 7,716,933 B2
(45) Date of Patent: May 18, 2010

(54) MULTI-CHANNEL FUEL MANIFOLD

(75) Inventors: Lev Alexander Prociw, Elmira (CA); Aleksander Kojovic, Oakville (CA); Harris Shafique, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 808 days.

(21) Appl. No.: 11/538,648

(22) Filed: Oct. 4, 2006

(65) Prior Publication Data

US 2008/0083223 A1     Apr. 10, 2008

(51) Int. Cl.
    *F02C 7/22*     (2006.01)
(52) U.S. Cl. .......................... 60/776; 60/739
(58) Field of Classification Search ............ 60/734, 60/739, 740, 772, 776; 239/548, 550
See application file for complete search history.

(56) References Cited

U.S. PATENT DOCUMENTS

| | | | |
|---|---|---|---|
| 2,151,540 A | 3/1939 | Varga | |
| 2,946,185 A | 7/1960 | Bayer | |
| 2,963,862 A * | 12/1960 | Jay | .............. 60/739 |
| 3,213,523 A | 10/1965 | Boehler | |
| 3,472,025 A | 10/1969 | Simmons et al. | |
| 3,859,787 A | 1/1975 | Anderson et al. | |
| 4,100,733 A | 7/1978 | Striebel et al. | |
| 4,322,945 A | 4/1982 | Peterson et al. | |
| 4,327,547 A | 5/1982 | Hughes et al. | |
| 4,404,806 A | 9/1983 | Bell, III et al. | |
| 4,483,137 A | 11/1984 | Faulkner | |
| 5,036,657 A | 8/1991 | Seto et al. | |
| 5,253,471 A | 10/1993 | Richardson | |
| 5,271,219 A | 12/1993 | Richardson | |
| 5,396,759 A | 3/1995 | Richardson | |
| 5,400,968 A | 3/1995 | Sood | |
| 5,419,115 A | 5/1995 | Butler et al. | |
| 5,423,178 A | 6/1995 | Mains | |
| 5,570,580 A | 11/1996 | Mains | |
| 5,579,645 A | 12/1996 | Prociw et al. | |
| 5,598,696 A | 2/1997 | Stotts | |
| 5,737,921 A | 4/1998 | Jones et al. | |
| 5,771,696 A | 6/1998 | Hansel et al. | |
| 5,848,525 A | 12/1998 | Spencer | |
| 5,956,955 A | 9/1999 | Schmid | |
| 5,983,642 A | 11/1999 | Parker et al. | |
| 5,996,335 A | 12/1999 | Ebel | |
| 6,109,038 A | 8/2000 | Sharifi et al. | |

(Continued)

FOREIGN PATENT DOCUMENTS

CA     1013153     7/1977

(Continued)

OTHER PUBLICATIONS

U.S. Appl. No. 11/220,849, Prociw et al.

(Continued)

*Primary Examiner*—Louis J Casaregola
(74) *Attorney, Agent, or Firm*—Ogilvy Renault LLP (57) ABSTRACT

A fuel manifold for a gas turbine engine having a first peripheral surface having a first channel defined therein and a second peripheral surface having a second channel defined therein, each of the first and second channels being sealingly enclosed to define a corresponding conduit.

15 Claims, 6 Drawing Sheets

U.S. PATENT DOCUMENTS

| | | | |
|---|---|---|---|
| 6,141,968 | A | 11/2000 | Gates et al. |
| 6,149,075 | A | 11/2000 | Moertle et al. |
| 6,240,732 | B1 | 6/2001 | Allan |
| 6,256,995 | B1 | 7/2001 | Sampath et al. |
| 6,463,739 | B1 | 10/2002 | Mueller et al. |
| 6,761,035 | B1 | 7/2004 | Mueller |
| 6,857,272 | B2 | 2/2005 | Summerfield et al. |
| 7,028,484 | B2 | 4/2006 | Prociw et al. |
| 2003/0014979 | A1 | 1/2003 | Summerfield et al. |
| 2005/0188699 | A1 | 9/2005 | Shafique et al. |
| 2006/0010873 | A1* | 1/2006 | Henriquez ............... 60/752 |
| 2006/0156731 | A1 | 7/2006 | Prociw et al. |
| 2006/0156733 | A1 | 7/2006 | Prociw et al. |
| 2006/0218925 | A1 | 10/2006 | Prociw et al. |

FOREIGN PATENT DOCUMENTS

| | | |
|---|---|---|
| CA | 2307186 | 5/1999 |
| CA | 2494950 | 3/2004 |
| CA | 2580327 | 9/2007 |
| EP | 0660038 | 6/1995 |
| EP | 0939275 | 9/1999 |
| GB | 2404976 | 2/2005 |
| WO | WO 9504244 | 2/1995 |

OTHER PUBLICATIONS

U.S. Appl. No. 11/465,655, Morenko.
U.S. Appl. No. 11/489,533, Morenko.
U.S. Appl. No. 11/366,815, Olver.
U.S. Appl. No. 11/366,816, Fish.
U.S. Appl. No. 11/366,814, Patel et al.
U.S. Appl. No. 11/466,137, Fish et al.
U.S. Appl. No. 11/513,030, Morenko et al.
U.S. Appl. No. 11/532,611, Rudrapatna et al.
U.S. Appl. No. 11/535,185, Morenko et al.
U.S. Appl. No. 11/534,381, Fish et al.
U.S. Appl. No. 11/552,240, Patel et al.
International Search Report of PCT/CA2007-001748.

* cited by examiner

FIG_4

FIG. 6

MULTI-CHANNEL FUEL MANIFOLD

TECHNICAL FIELD

The invention relates generally to fuel conveying members in a gas turbine engine and, more particularly, to an improved fuel manifold.

BACKGROUND OF THE ART

Known internal fuel manifolds for gas turbine engines include manifolds formed from a machined ring axially receiving a plurality of fuel nozzles tips that inject atomized fuel into the engine combustor. Fuel is provided to the nozzles by conduits formed by one or more channels machined in a single peripheral surface of the ring and sealed with a sealing member. The channels are defined in the single peripheral surface either in a side-by-side or superposed (i.e. nested) configuration. Addition of a channel (for cooling, staging, etc.) usually necessitates either the width or thickness of the manifold to be increased, thus increasing the weight of the manifold.

Therefore, there is a need for an improved fuel manifold.

SUMMARY OF THE INVENTION

It is therefore an object of this invention to provide an improved fuel manifold.

In one particular aspect, the present invention provides a fuel manifold for a gas turbine engine, the fuel manifold comprising an annular body defining a plurality of peripheral surfaces, a first one of the peripheral surfaces having a first channel defined therein, a second one of the peripheral surfaces having a second channel defined therein, each of the first and second channels being sealingly enclosed to define a corresponding fluid conveying conduit, and the body having at least one inlet and at least one outlet defined therein in communication with each of the first and second channels.

In another aspect, the present invention provides a method of manufacturing a gas turbine engine fuel manifold, the method comprising providing an annular body, machining a first channel in a first peripheral surface of the annular body, machining a second channel in a second peripheral surface of the annular body, forming at least one inlet in the annular body in communication with each of the first and second channels, forming at least one outlet in the annular body in communication with each of the first and second channels, and sealingly enclosing the first and second channels to define corresponding conduits.

In a further aspect, the present invention provides a fuel manifold for a gas turbine engine, the fuel manifold comprising an annular body defining a plurality of peripheral surfaces, the body having first means for circulating fluid defined in a first one of the peripheral surfaces, second means for circulating fluid defined in a second one of the peripheral surfaces, and at least one inlet and at least one outlet defined therein in communication with each of the first and second means.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 2b is a schematic partial rear perspective view of the fuel injection system of FIG. 2a;

FIG. 3 is a cross-sectional view taken through line 3-3 of FIG. 2a;

DETAILED DESCRIPTION OF THE PREFERRED EMBODIMENTS

Figure 1:
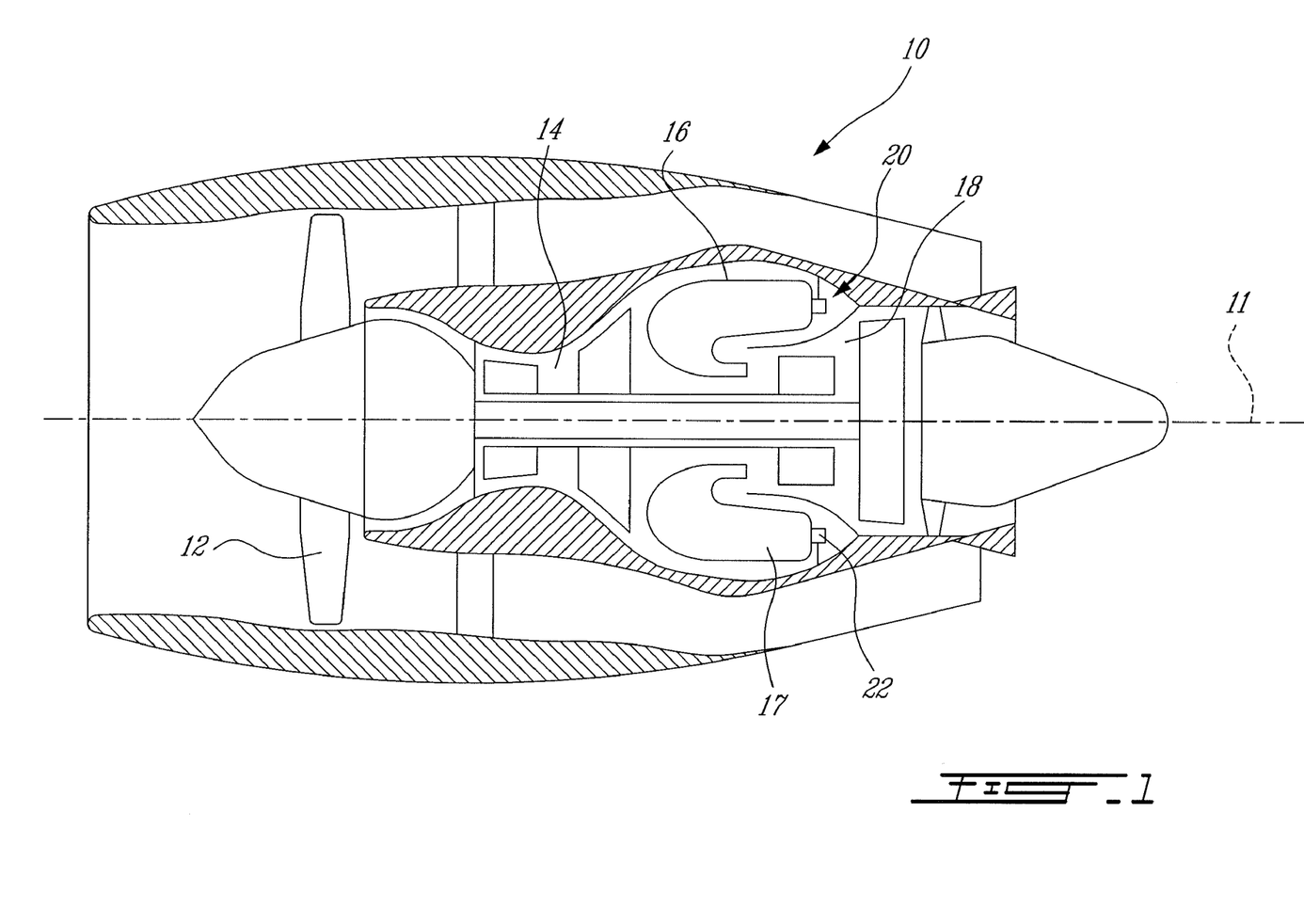
FIG. 1 is a schematic cross-section of a gas turbine engine.

FIG. 1 illustrates a gas turbine engine 10 of a type preferably provided for use in subsonic flight, generally comprising in serial flow communication a fan 12 through which ambient air is propelled, a compressor 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 by a fuel injection system 20, which includes a fuel source (not shown) and at least one fuel conveying assembly or internal fuel manifold 22. The fuel injection system 20 is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

Figure 2A:
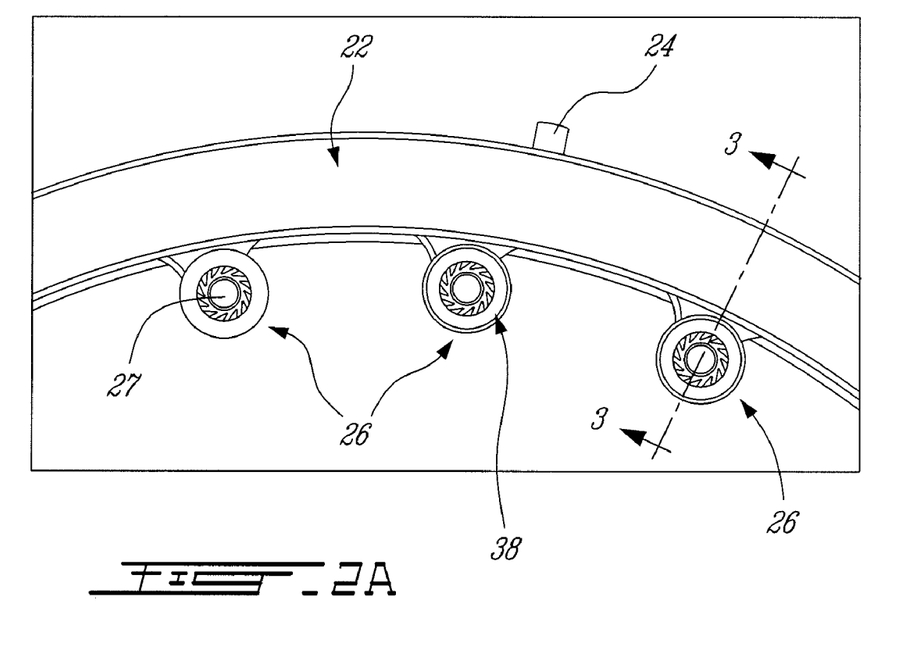
FIG. 2a is a schematic partial front perspective view of a fuel injection system in accordance with a particular embodiment of the present invention.
Figure 2B:
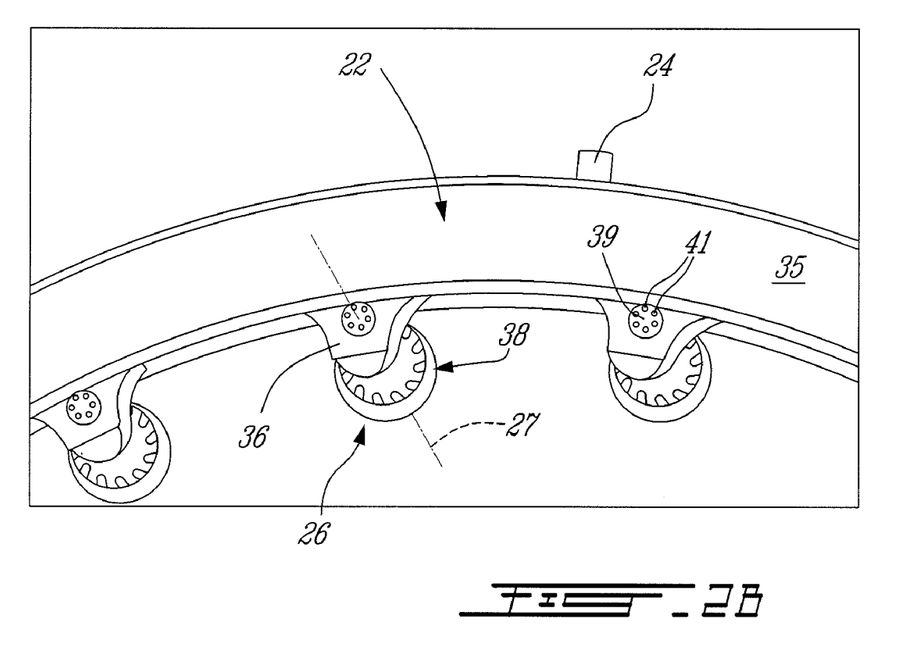

Referring to FIGS. 2a-2b, the fuel injection system 20 according to a particular embodiment of the present invention generally comprises the annular fuel manifold 22 and a plurality of fuel nozzles 26 mounted thereto and adapted to inject a fuel/air mixture into the combustion chamber 17 (see FIG. 1) of the combustor 16. The fuel nozzles 26 particularly include spray tips 38 which project into the combustion chamber 17. The annular fuel manifold 22 is mounted adjacent to the combustor 16 outside an upstream end thereof, preferably to surrounding casing support structure within the gas turbine engine 10 via several radially extending locating pins 24.

The fuel nozzles 26 are mounted to the fuel manifold 22 about the circumference thereof, and are preferably evenly distributed thereabout. Each fuel nozzle 26 is radially offset from the main body 21 of the fuel manifold ring 22 such that a generally or substantially unobstructed flow of air may enter via air inlets 41 in the rear body 39 of the fuel nozzle 26 (disposed outside the combustion chamber 17, see FIG. 3) and is subsequently fed through a central core passage of each nozzle 26 without passing through the fuel conveying body of the fuel manifold ring 22.

A plurality of mounting members 36, preferably integrally formed with the main body 21 of the fuel manifold 22, radially extend inwardly therefrom and define an opening 43 (see FIG. 3) within which the main body 42 of each fuel nozzle 26 is received, such that the fuel nozzle bodies 42 are radially inwardly offset from the fuel manifold 22. A heat shield 35 encloses the main body 21 of the fuel manifold 22 with preferably only the mounting members 36 left exposed.

Figure 3:
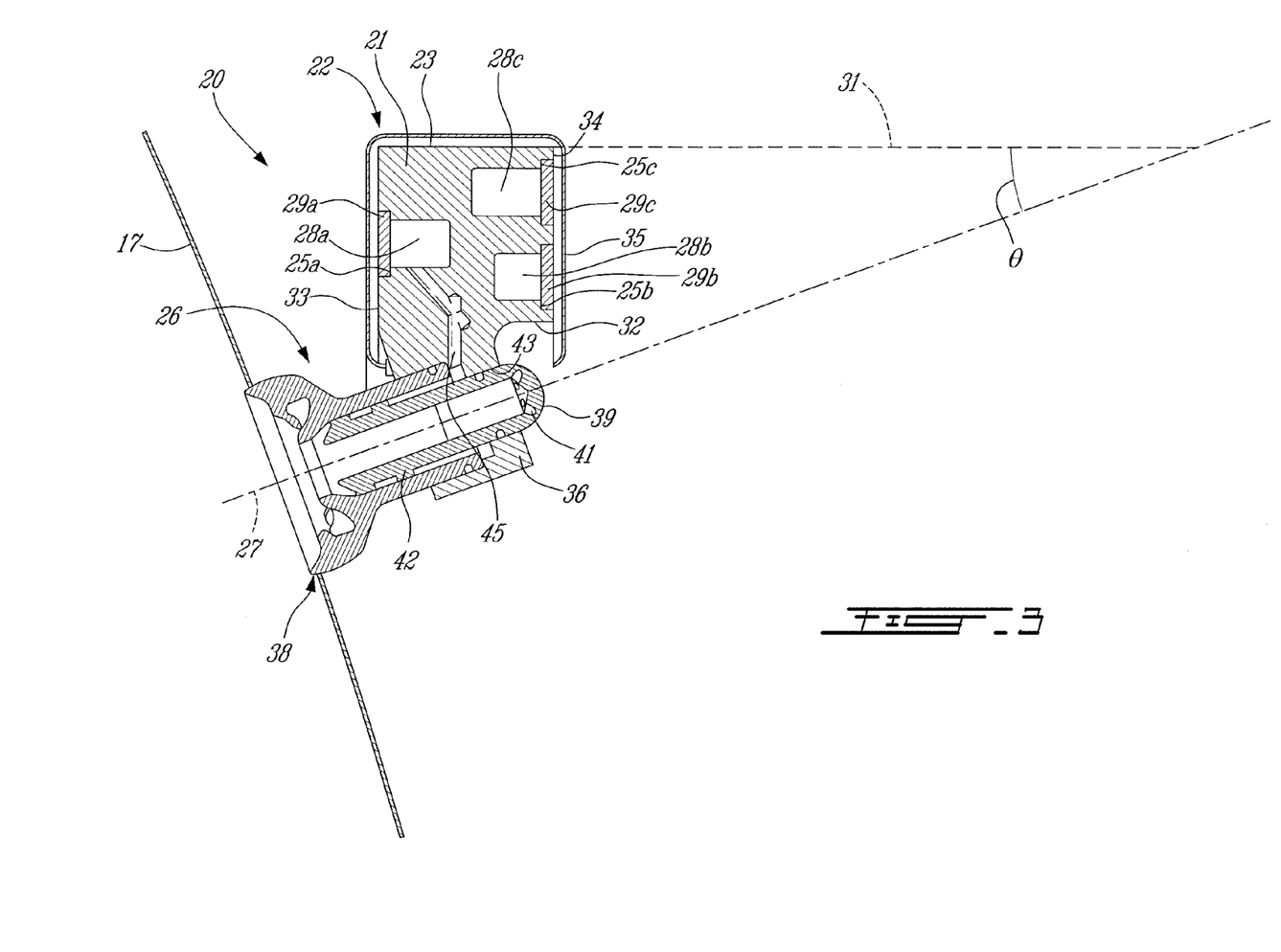

Referring to FIG. 3, the annular fuel manifold body 21 defines four peripheral surfaces, namely two radially extending surfaces (with respect to the central axis 11 of the engine 10), and two circumferentially extending surfaces (also with respect to the central axis 11). The circumferential surfaces include an outer surface 23 and an inner surface 32, and the radial surfaces include a frontward surface 33 and a rearward surface 34. The mounting members 36 in the embodiment shown extend from the inner surface 32. The central axis 27 of each fuel nozzle 26 defines an angle θ relative to a line 31 which corresponds to the manifold outer surface 23, such that the spray tips 38 of the fuel nozzles 26 point radially inwards toward the center of the combustion chamber 17.

The manifold 22 has at least two channels defined therein, the two channels being formed in different ones of the peripheral surfaces, for example by machining using a turning operation. In the embodiment shown in FIG. 3, a first channel 28a is machined in the frontward surface 33, and second and third channels 28b,c are machined side by side in the opposed rearward surface 34. The first channel 28a is offset with respect to the second channel 28b such as to minimise the thickness and weight of the manifold body 21. Each channel 28a,b,c is sealingly enclosed by a corresponding sealing member or plate 29a,b,c which can be for example fastened to corresponding annular flanges 25a,b,c. Each channel 28a,b,c, in at least one embodiment, is independently fed by a respective inlet (not shown).

A plurality of outlets 45 (only one being shown) are defined in the manifold body 21 in communication with one of the channels 28a,b,c and with the opening 43 in the corresponding support member 36, for communication with the spray tip 38 of the fuel nozzle 26 retained therein. The outlet 45 shown in FIG. 3 provides fluid communication between the fuel nozzle 26 and the first channel 28a. In a particular embodiment, all the nozzles 26 are in communication with the first channel 28a, and the second and third channels 28b,c are used to circulate coolant, such as for example recirculated fuel.

In an alternate embodiment, some of the fuel nozzles 26 are in communication with the first channel 28a while the other fuel nozzles 26 are in communication with the second channel 28b, the first and second channels 28a,b independently circulating fuel while the third channel 28c circulates coolant or is omitted. Such a configuration allows for a different fuel flow in different locations of the combustion chamber 17 for fuel staging purposes. In another alternate embodiment, the fuel nozzles 26 shown are replaced by fuel nozzles having a primary distributor and a secondary fuel swirling cavity, and the first channel 28a defines the primary fuel conduit, in communication with the primary distributor of all the fuel nozzles, while the second channel 28b defines the secondary fuel conduit, in communication with the secondary fuel swirling cavity of all the fuel nozzles. The third channel 28c can circulate coolant or be omitted.

The machining of at least two channels 28a,b in different ones of the peripheral surfaces 33, 34, and especially in opposed ones of the peripheral surfaces, allows as compact an envelope as possible to be maintained for the manifold 22, thus maintaining the weight of the manifold 22 as low as possible.

Figure 4:
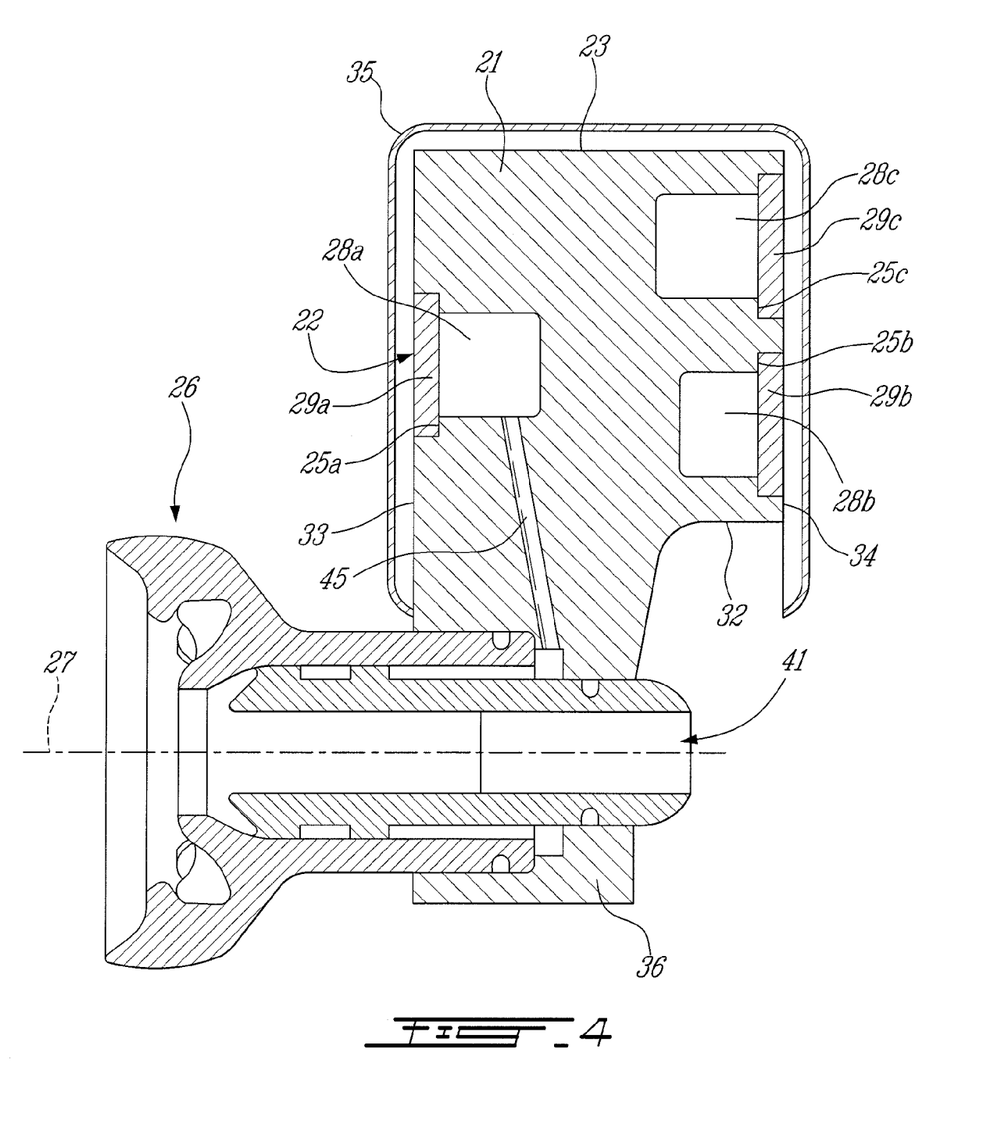
FIGS. 4 and 5 are cross-sectional views of alternate embodiments similar to FIG. 3.
Figure 5:
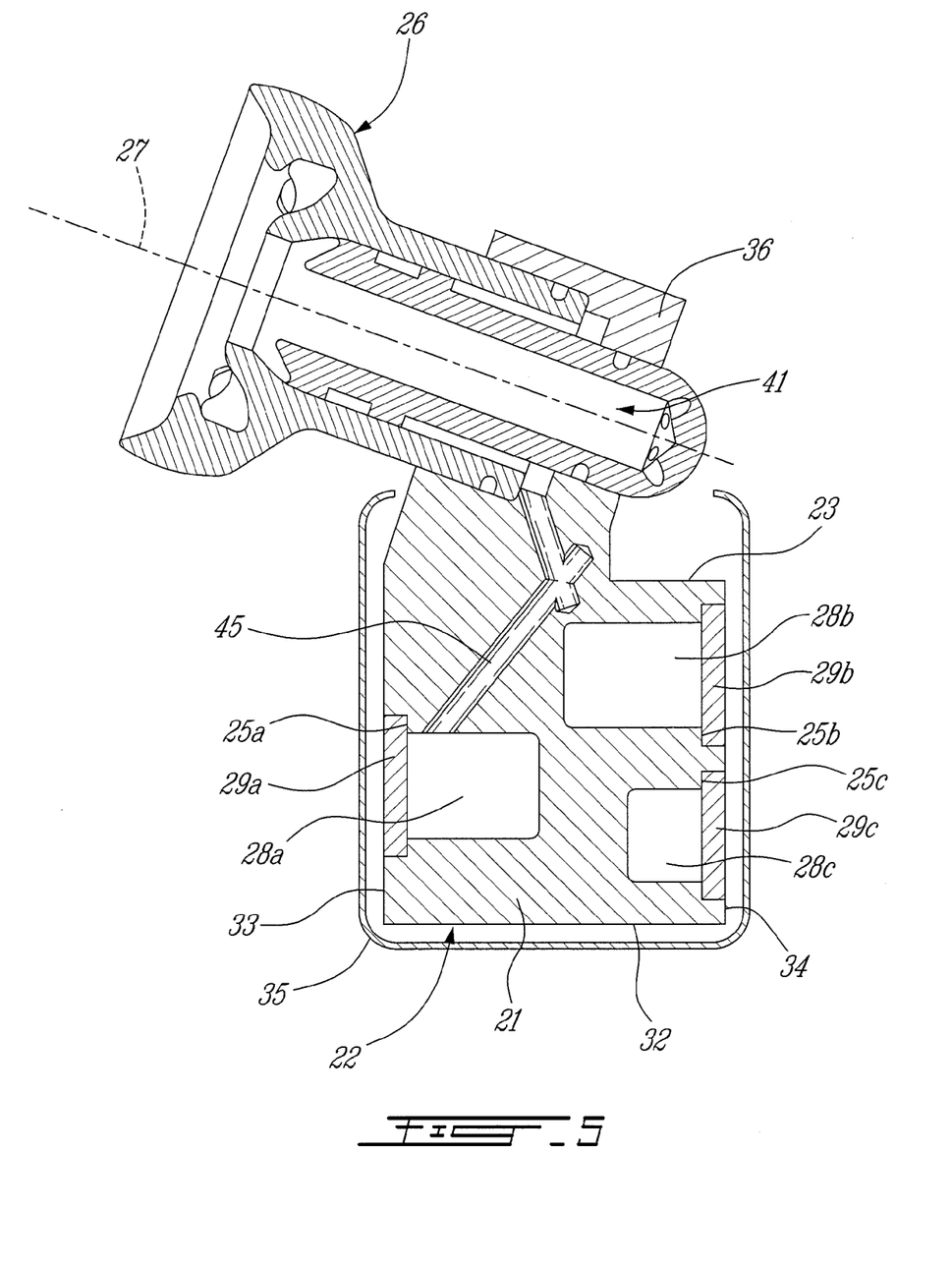

FIG. 4 shows an embodiment similar to that of FIGS. 2a to 3, except that the inwardly offset nozzles 26 are in a configuration where θ=0. FIG. 5 also shows an embodiment similar to that of FIG. 2a to 3, except that the mounting members 36 extend radially outwardly from the outer surface 23 of the manifold body 21, such that the fuel nozzle bodies 42 are outwardly radially offset from the fuel manifold 22. This allows for a lighter design since the manifold 22 is smaller for a same position of the fuel nozzles 26 within the combustion chamber 17. In a further embodiment not depicted, the mounting members project alternately radially inwardly and radially outwardly, to provide two concentric arrays of fuel nozzles. In a still further embodiment not shown, the mounting members are provided in varying distances from the manifold (i.e. from the inside, or the outside, or both), to provide two or more concentric arrays of fuel nozzles.

Figure 6:
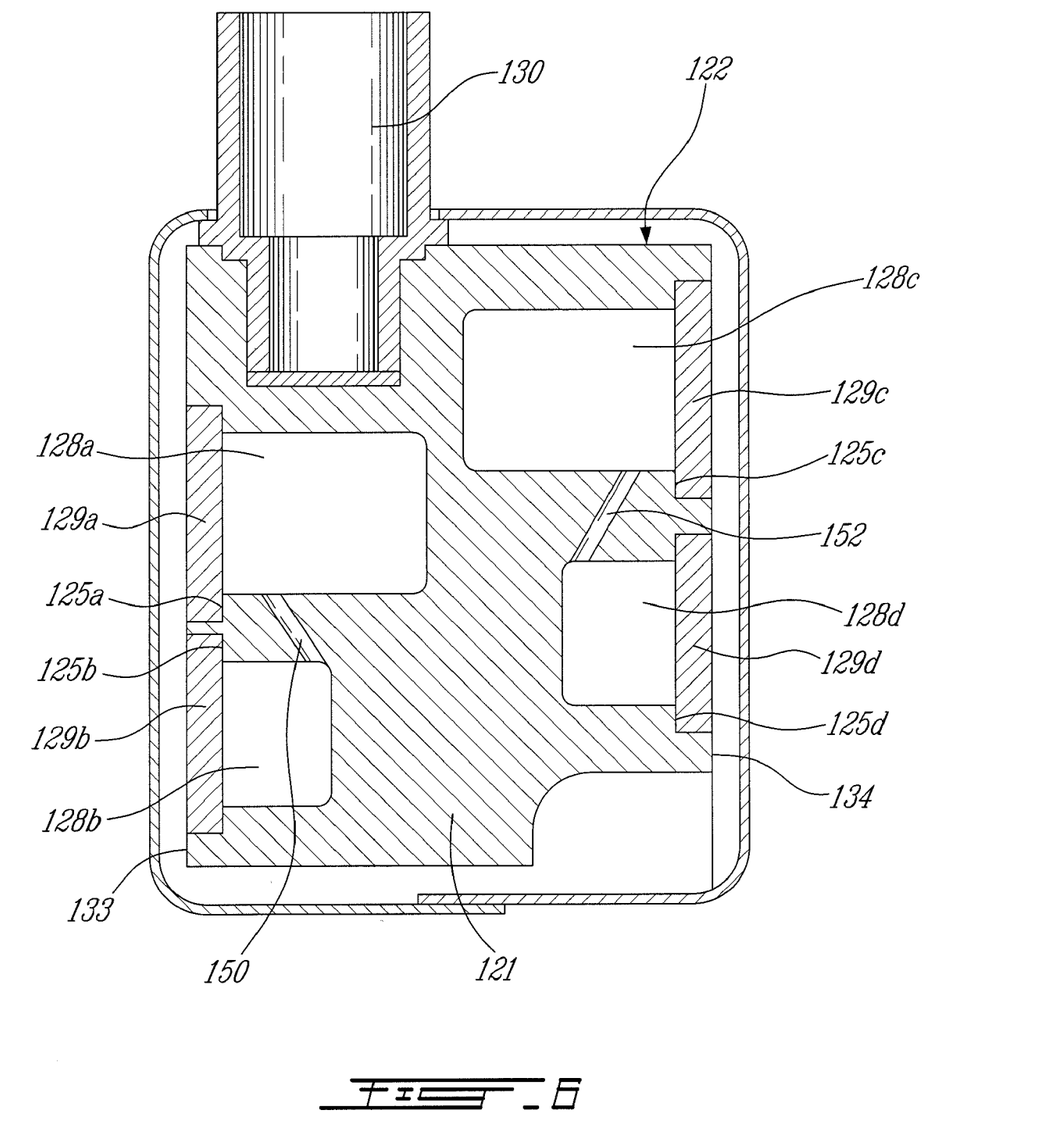
FIG. 6 is a cross-sectional view of a further embodiment of the present invention.

Referring to FIG. 6, a further embodiment of the manifold 122 in shown. The manifold 122 has first and second channels 128a,b formed side by side in the frontward surface 133, and third and fourth channels 128c,d machined side by side in the opposed rearward surface 134. The first and second channels 128a,b are offset with respect to the third and fourth channels 128c,d such as to minimise the thickness and weight of the manifold body 121. Each channel 128a,b,c,d is sealingly enclosed by a corresponding sealing member or plate 129a,b,c,d, which can be for example fastened to corresponding annular flanges 125a,b,c,d.

The first channel 128a is in communication (not shown) with a corresponding inlet 130. The first channel 128a also has a plug therein (not shown) adjacent the inlet 130, such that fluid entering the channel 128a through the inlet 130 is driven unidirectionally around the manifold body 121. At the end of the channel 128a (i.e. adjacent the plug opposite of the inlet 130) a connection 150 is defined between the first and second channels 128a,b. The second channel 128b is in fluid communication with the fuel nozzles (not shown). As such, fuel enters the first channel 128a through the inlet 130 and circulates along the entire length of the first channel 128a, then enters the second channel 128b through the connection 150 and is circulated to the fuel nozzles.

Similarly, the third channel 128c is in fluid communication with a corresponding inlet (not shown), includes a plug (not shown) and a connection 152 defined between the third and fourth channels 128c,d adjacent the plug opposite of the inlet. In a particular embodiment the third and fourth channels 128c,d are used to circulate coolant, and the lengthened path obtained by having the fuel and coolant circulate successively through two channels improves the heat exchange between the fuel and coolant. In an alternate embodiment, the fourth channel 128d is in fluid communication with fuel nozzles (not shown) and fuel is also circulated through the third and fourth channels 128c,d. The lengthened fuel path is used to control the pressure drop to a desired level through appropriate sizing of the channels 128a,b,c,d.

The above description is meant to be exemplary only, and one skilled in the art will recognize that changes may be made to the embodiments described without departing from the scope of the invention disclosed. For example, for an industrial gas turbine application, the manifold 22, 122 can be used to deliver different fuels to different operators, one channel defined in a first peripheral surface circulating gaseous fuel such as natural gas, and another channel defined in a second peripheral surface circulating liquid fuel such as water or diesel. The described manifold 22, 122 can also be used with fuel nozzles which are not offset from the manifold, providing the connection between the fuel nozzles and the manifold allows channels to be defined in at least two peripheral surfaces of the manifold, and preferably on two opposed surfaces. The channels 28a,b,c, 128a,b,c,d can also be defined in the circumferential surfaces 23, 32 of the manifold 22, 122. The channels 28a,b,c and 128a,b,c,d can be formed in the peripheral surfaces of the manifold by any suitable manufacturing method, whether by machining (such as turning) or otherwise. Still other modifications which fall within the scope of the present invention will be apparent to those skilled in the art, in light of a review of this disclosure, and such modifications are intended to fall within the appended claims.

What is claimed is:

1. A fuel manifold for a gas turbine engine, the fuel manifold comprising an annular body defining a plurality of peripheral surfaces, a first one of the peripheral surfaces having a first channel defined therein, a second one of the peripheral surfaces having a second channel defined therein, each of the first and second channels being sealingly enclosed to define a corresponding fluid conveying conduit, the body having at least one inlet and at least one outlet defined therein in communication with each of the first and second channels, and the fuel manifold including mounting members for supporting fuel nozzles, the mounting members extending from a circumferentially extending one of the peripheral surfaces to support the fuel nozzles either radially inwardly or radially outwardly of the body.

2. The fuel manifold as defined in claim 1, wherein the first and second peripheral surfaces are opposed surfaces.

3. The fuel manifold as defined in claim 1, wherein the first and second peripheral surfaces are frontward and rearward radially extending surfaces of the body.

4. The fuel manifold as defined in claim 1, wherein the first peripheral surface has a third channel defined therein, the third channel being in fluid communication with the first channel.

5. A method of manufacturing a gas turbine engine fuel manifold, the method comprising:
  providing an annular body;
  forming a first channel in a first peripheral surface of the annular body;
  forming a second channel in a second peripheral surface of the annular body;
  forming at least one inlet in the annular body in communication with each of the first and second channels;
  forming at least one outlet in the annular body in communication with each of the first and second channels;
  sealingly enclosing the first and second channels to define corresponding conduits; and
  forming a plurality of mounting members extending from a circumferentially extending peripheral surface of the annular body, each mounting member being adapted to support a fuel nozzle in fluid communication with a respective one of the at least one outlet.

6. The method as defined in claim 5, wherein forming at least one outlet in communication with the first channel includes forming one outlet for each fuel nozzle to be received on the manifold.

7. The method as defined in claim 5, further comprising selecting the first and the second peripheral surfaces to be opposed surfaces of the annular body.

8. The method as defined in claim 7, further comprising selecting the first and second peripheral surfaces to be frontward and rearward radially extending peripheral surfaces of the annular body.

9. The method as defined in claim 5, further comprising machining a third channel in the first peripheral surface and defining a fluid communication between the first and third channels.

10. A fuel injection system of a gas turbine engine comprising:
  a fuel manifold having an annular body defining a plurality of peripheral surfaces, the body having at least one first fuel conveying channel defined in a first one of the peripheral surfaces, at least one second fuel conveying channel defined in a second one of the peripheral surfaces, and at least one inlet and at least one outlet defined therein in communication with the first and second fuel conveying channels;
  a plurality of fuel nozzles mounted to the fuel manifold; and
  wherein the first fuel conveying channel is in fluid flow communication with a first group of the plurality of fuel nozzles, the second fuel conveying channel is in fluid flow communication with a second group of the plurality of fuel nozzles, and the first and second fuel conveying channels independently convey fuel to the respective first and second groups of fuel nozzles.

11. The fuel manifold as defined in claim 10, wherein the first and second channels are sealingly enclosed by a respective sealing member.

12. The fuel manifold as defined in claim 10, wherein the first and second peripheral surfaces are opposed surfaces.

13. The fuel manifold as defined in claim 10, wherein the first and second peripheral surfaces are frontward and rearward radially extending surfaces of the body.

14. The fuel manifold as defined in claim 10, further comprising means for supporting fuel nozzles one of radially inwardly and radially outwardly of the body, the support means extending from a circumferentially extending one of the peripheral surfaces.

15. The fuel manifold as defined in claim 10, wherein the body further includes a third fuel conveying channel for circulating fuel defined in the first peripheral surfaces, the first and the third fuel conveying channels being in fluid communication with one another.

\* \* \* \* \*